United States Patent [19]

Peoples

[11] 3,904,839

[45] Sept. 9, 1975

[54] LOOP FAULT LOCATER

[75] Inventor: John Terrance Peoples, Berkeley Heights, N.J.

[73] Assignee: Bell Telephone Laboratories, Incorporated, Murray Hill, N.J.

[22] Filed: July 18, 1974

[21] Appl. No.: 489,580

[52] U.S. Cl. ............................ 179/175.3 F; 324/52

[51] Int. Cl.$^2$ ............................................ H04B 3/46

[58] Field of Search ............... 179/175.3 F, 175.3 R; 324/52

[56] References Cited

UNITED STATES PATENTS 3,612,782 10/1971 Gilbert ......................... 179/175.3 F 3,751,606 8/1973 Kaiser........................... 179/175.3 F

*Primary Examiner*—Kathleen H. Claffy

*Assistant Examiner*—Douglas W. Olms

*Attorney, Agent, or Firm*—R. O. Nimtz

[57] ABSTRACT

Faults on a telephone cable pair are located by a frequency-domain detection system. The derivative, with respect to frequency, of the phase angle of the complex input impedance of the pair is measured periodically across a predetermined frequency band to produce a periodic time function. The power spectrum of this function is determined and the frequencies of the spectrum maxima are used to estimate the distances to all of the faults from the measurement point.

3 Claims, 11 Drawing Figures

SELECTED TERMS FROM EQUATION (2)

$A_1(f)e^{-2\alpha(f)d_1}\sin(2K_1d_1f+\theta_1)$ $A_4(f)e^{-2\alpha(f)d_4}\sin(2K_1d_4f+\theta_4)$ $$f = f_1 + \left(\frac{f_2 - f_1}{f_r T}\right) t \qquad 0 < t \leq f_r T$$

$$0 < f_r \leq 1$$

TYPICAL EXAMPLES OF EQUATIONS (5) & (6)

LOOP FAULT LOCATER

FIELD OF THE INVENTION

This invention relates to communications transmission line fault location in general, and in particular concerns a loop fault locater to be used from a centralized position.

BACKGROUND OF THE INVENTION

In telephone loops, a number of common faults occur from time to time which must be detected, located, and repaired. Principally, these include: two-sided faults (both tip and ring wires of a pair faulted at one point) such as shorts and opens, for example, and one-sided faults (either tip or ring wire of a pair faulted at one point) such as opens, grounds, crosses, etc., and trace to manufacturing defects or, more usually, physical damage to the cable in usage.

Locating each fault expeditiously and inexpensively has in the past proved no easy matter. After the Repair Service Bureau determines that a fault is outside the central office, a station repairman usually is sent to the customer's premises to inspect the telephone set. If the trouble is not there, a cable repairman subsequently makes several direct current or low frequency measurements at accessible points along the cable pair with portable test sets which are selected from his truck based on the type of fault. His objective is to sectionalize, localize, and ultimately pinpoint the fault, and then repair it. The location process involves considerable time and expense.

In the inspection of coaxial cable after manufacture, a system of fault detection has been used which relies on swept frequency output over a bandwidth of, for example, 2.0 to 12.4 GHz. In this system, the types of coaxial cable fault being sought can, for example, be a nonterminated end, a large impedance irregularity such as a depression in the outer tube, etc. A sweep oscillator output is connected to the cable and a discontinuity produces a reflection which combines with the incident signal at a crystal detector with a phase relationship that varies with both the distance to the discontinuity and the signal frequency. The number of "ripples" appearing across the full width of a display is a measure of the distance from the discontinuity to the detector. If there are faults at two locations in the cable, the vector sum of the two ripple patterns will be displayed, and the component ripples associated with each fault must be distinguished visually in order to locate the faults.

The adaptation of a swept frequency system of the type described to the location of telephone loop faults is not trivial. Nonloaded multipair telephone cable ranges typically up to 18,000 feet in installed length and has a loss and propagation velocity which are strongly frequency dependent. As the measurement bandwith is swept from low to high frequencies, increasing loss causes the ripple amplitude to decrease monotonically and increasing propagation velocity causes the ripple period to increase monotonically. In contrast, swept frequency techniques of the prior art were addressed to coaxial cable less than 100 feet in length which has a relatively constant loss and propagation velocity across the entire swept bandwidth. These differences together with the high probability of non-fault-type impedance irregularities on telephone loops such as gauge changes and bridged taps, for example, make the interpretation of the output "ripple" signal, at least in its raw visual form, difficult and in most cases impossible.

More generally, by far the preferred approach to loop fault detection is from a central automated desk located in each central office, or centrally with respect to several such offices, thereby minimizing duplicate items of test equipment and physical inspections along a cable route.

U.S. Pat. No. 3,751,606, issued to C. W. Kaiser, Jr., and assigned to the same assignee as is this application shows a swept frequency system whereby the real or imaginary part of the complex return loss is measured at the central office to locate faults. This system has the disadvantage of requiring a standard line to be provided or built in conjunction with the test equipment in order to measure return loss. In addition it has been found that the system disclosed in U.S. Pat. No. 3,751,606 produces spectrum peaks which are weak and possibly unrecognizable for more distant faults from the central office.

In order to overcome these prior art difficulties the following are objects of this invention:

to produce a swept frequency loop fault locator which does not require the provision or simulation of a standard line;

to produce a swept frequency loss fault locater which provides greater detection sensitivity of distant faults.

SUMMARY OF THE INVENTION

The basic procedure involves measuring the derivative with respect to frequency of the phase angle of the input impedance of the line over a frequency range of several octaves above 10 kHz. A periodic time function $g(t)$ is generated by a periodic sweeping of frequency across the measurement bandwith. The power spectrum of the function $g(t)$ is determined, and the frequencies of the power spectrum maxima are used to estimate the distances from the measurement point to the impedance irregularities on the loop.

In a specific embodiment of the invention, analog circuits are used to produce a signal proportional to the derivative with respect to frequency of the input impedance phase angle; a commercially available spectrum analyzer is used to determine spectrum maxima of the signal. Several large impedance irregularities can be located simultaneously on nonloaded loops pursuant to the teachings of this invention.

The invention and its further objects, features, and advantages will be more readily appreciated from a reading of the description to follow of the detailed embodiment thereof.

DETAILED DESCRIPTION

Figure 1:
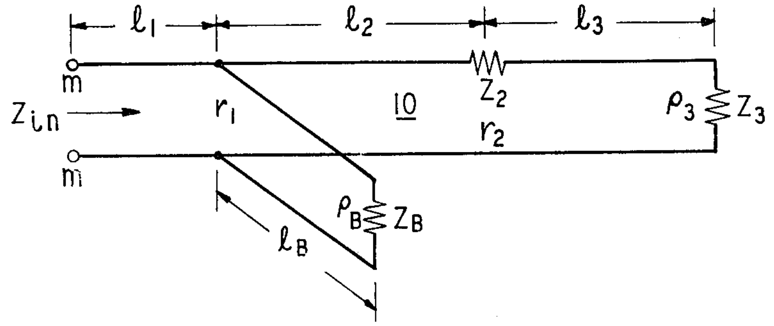

The transmission line model of a balanced cable pair designated 10 in FIG. 1 has, by way of example, four lumped impedance irregularities. The impedances designated by $Z_B$ and $Z_3$ are shorts and the impedance $Z_2$ is a one-sided open. The fourth irregularity is caused by a bridged tap, not a fault, and is located at the junction point. The distances from the terminals $m$ in a central office to the impedance irregularities are:

$$d_1 = l_1$$

$$d_2 = l_1 + l_B$$

$$d_3 = l_1 + l_2$$

$$d_4 = l_1 + l_2 + l_3$$

The objective is to determine the distances $d_{1\text{-}4}$ from single-ended meansurements made at the terminals $m$.

Theory

The complex input impedance of a transmission line as a function of radian frequency, $\omega$, is defined by:

$$Z(\omega) = \frac{V(\omega)}{I(\omega)} = Re(Z) + jIm(Z) \quad (1)$$

or $$Z(\omega) \angle \Phi(\omega)$$

where $$Z(\omega) = [Re(Z)^2 + Im(Z)^2]^{1/2} \quad (2)$$

$$\phi(\omega) = \tan^{-1} Im(Z)/Re(Z)$$

The quantity $d\phi(\omega)/d\omega$ is measured as a function of frequency at the central office.

It can be shown that the function $d\phi(\omega)/d\omega$ for a faulted circuit as shown in FIG. 1 is represented as $$\frac{d\phi(\omega)}{d\omega} = \frac{d\phi_o}{d\omega} + \sum_{i=1}^{4} A_i(f) e^{-2\alpha d_i} \sin(2K_1 d_i f + \theta_i) + Im \frac{d}{d\omega}(M.R.T.(Z_o)) . \quad (3)$$

The quantity $d\phi o/d\omega$ is approximately a dc term generated by any impedance mismatch at the measurement point. The $A_i$ are coefficients which are larger than corresponding prior art coefficients for expansions for the real part of return loss. The large size of these coefficients accounts for the increased sensitivity of this method over prior art measurements of the power spectra maxima of a waveform resulting by energizing a transmission line with a swept frequency voltage. The $A_i$ coefficients, although frequency dependent, vary slower than the sine function with increasing frequency and can reasonably be assumed to be frequency independent. The quantity $\alpha$ is the line attenuation constant; the $d_i$ are the distances from the measurment point to the four impedance irregularities. The quantity $\beta$, the line phase shift, has been approximated by $$\beta = K_1 f + K_2 \quad (4)$$

where frequency is $$f = \frac{\omega}{2\pi},$$

$K_1$ is a known, fixed constant dependent on gauge. The expression M.R.T.$(Z_o)$ designates the multiple reflection terms.

Figure 2A:
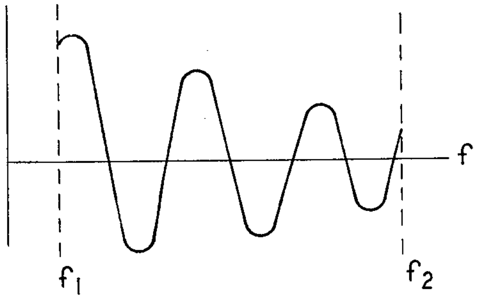
Figure 2B:
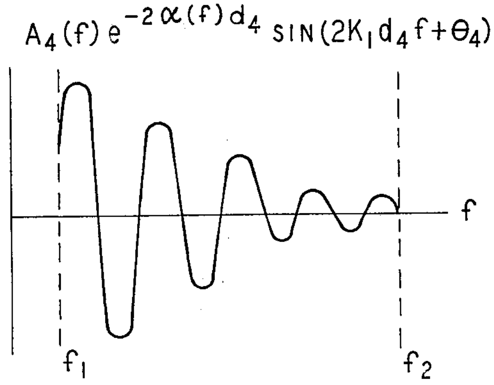
Figure 2C:
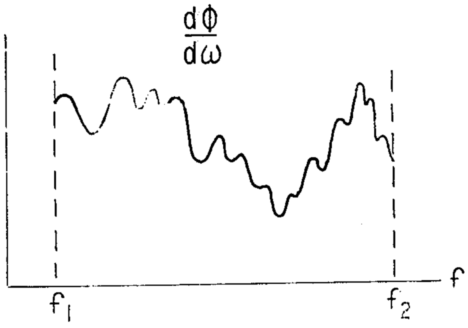

After expanding the summation indicated in Equation (3) it will be seen that the second through the fifth terms are similar functions respectively of the distances to the four irregularities. Each of these terms is an exponentially damped sinusoid as a function of increasing frequency. The frequencies of sinusoidal variation are linearly related to the distances $d_{1\text{-}4}$ to the impedance irregularities. The second such term is shown in FIG. 2A and the fifth such term is shown in FIG. 2B for purposes of comparison. The quantity $d\phi/d\omega$ which is the sum of all these terms, is shown in FIG. 2C.

It is desired to determine the distances $d_i$ from the terminals $m$ to the impedance irregularities by measuring the four frequencies of sinusoidal variation indicated in the second through fifth terms respectively of Equation (2).

Figure 3:
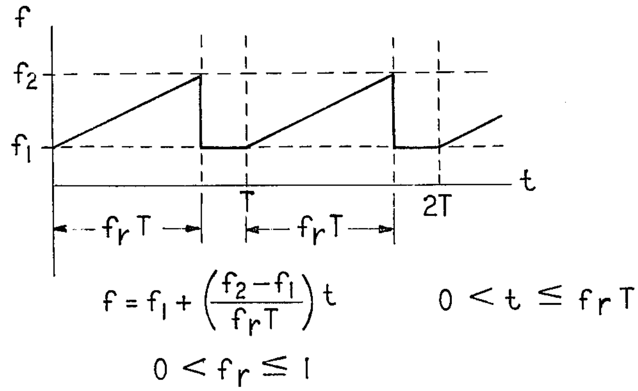

Fourier analysis may be used to determine the frequency content of periodic functions. Consequently, a set of periodic time functions $P_i(t)$ is defined as follows:

$$P_i(t) = \sum_{n=-\infty}^{\infty} a_i(t-nT) \quad (i = 0,1, \ldots, 4) \quad (5)$$

where frequency is made to vary as shown in FIG. 3. The components of the expansion in Equation (3) become, $$a_o(t) = \begin{cases} \frac{d\phi_o}{d\omega_o} & 0 \leq t \leq f_r T \\ & \text{elsewhere} \end{cases}$$

$$a_i(t) = A_i(f) e^{-2\alpha d_i} \sin(2K_1 d_i f + \phi_i) \quad 0 \leq t \leq f_r T \quad (6)$$
$$= 0 \quad \text{elsewhere}$$

where $$f = f_1 + \left(\frac{f_2 - f_1}{f_r T}\right) t$$

and $$0 < f_r \leq 1$$

Figure 4A:
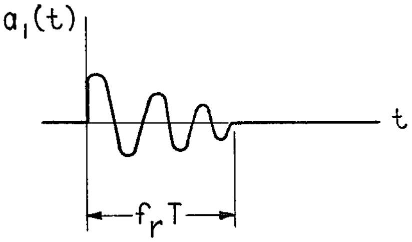
Figure 4B:
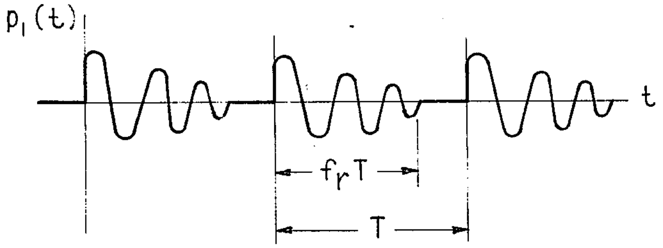

Examples of $a_i(t)$ and $P_i(t)$ are illustrated in FIGS. 4A and 4B, respectively.

Figure 4C:
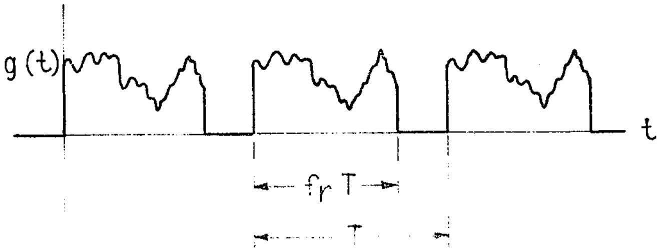

Consider now a function $g(t)$ defined as follows:

$$g(t) \triangleq \sum_{i=0}^{4} P_i(t) + (M.R.T.) \quad (7)$$

which is just a periodic generation of the function $d\phi(\omega)/d\omega$. (See FIG. 4C).

It can be shown that the power spectrum of $g(t)$ where $i = 1\text{–}4$ has a maximum at:

$$(f_{max})_i = [K_1(f_2 - f_1)d_i]/[\pi f_r T] \quad (i = 1\text{–}4) \quad (8)$$

Since $g(t)$ is a sum of $P_1(t)$ terms, its power spectrum will have four maxima at the frequencies given by Equation (8) provided the $P_0(t)$ term and the multiple reflection terms of Equation (7) can be neglected and provided further the four maxima are sufficiently separated in frequency that interaction among the frequency spectra of the second through the fifth terms does not significantly affect their locations.

These assumptions are reasonable and valid for the application of the present invention to telephone loop fault location. It follows that estimates of the distances $d_{1\text{-}4}$ to the four lumped impedance irregularities of the transmission line model of FIG. 1 are $$d_i = \pi f_r T (f_{max})_i]/[K_1(f_2 - f_1)] \quad (i = 1\text{–}4) \quad (9)$$

It should be noted that as bandwidth changes, the value of $(f_{max})_i$ changes also, since the distance $d_i$ is of course the same. Thus, the fixed distance appears at different frequencies.

Implementation

Figure 5:
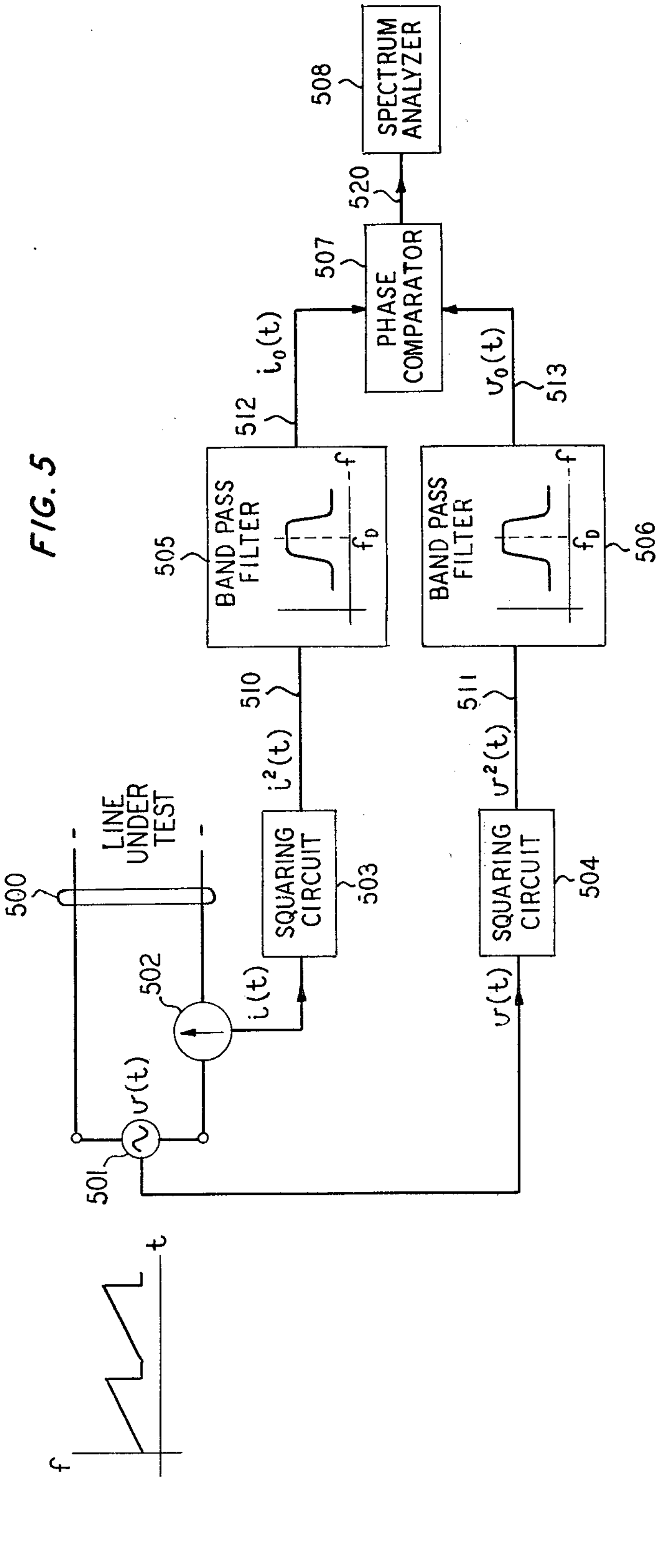

Implementation of the above-described fault location technique is set out in block diagram form in FIG. 5. Basically it is desired to apply a swept-frequency sinusoidal voltage to a line under test, measure the current which flows in the line, determine the phase difference between voltage and current as a function of frequency, and determine frequency maxima of spectrum of the phase difference derivative.

A test line 500 is energized with a swept-frequency sinusoidal voltage signal 501. The current flowing in response to the voltage is measured by an ammeter 502. The current and voltage signals are each squared by squaring circuits 503 and 504. The squared current and voltage are applied to bandpass filters 505 and 506. The outputs of the bandpass filters 505, 506 are applied to a phase comparator circuit 507. The output of the phase comparator circuit is a periodic waveform proportional to the derivative with respect to frequency of the input impedance phase angle. This output is applied to a spectrum analyzer 508 which provides a visual indication of the magnitude of the frequency components of the complex periodic waveform as a function of frequency.

Figure 6:
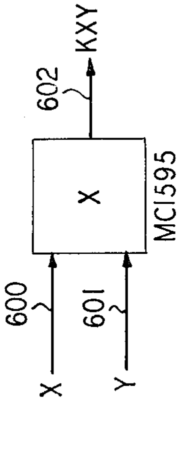

More specifically, suppose the input voltage to the line under test is not being swept:

$$v(t) = A\cos(\omega_1 t) + B\cos((\omega_1 - \omega_D)t + \xi), \quad (10)$$

where A and B represent the magnitude of each sinusoid and $\omega_1 = 2\pi f_1$ $\omega_D = 2\pi f_D$ and $\xi$ represent a fixed phase angle. The input current is expressed by the sum of each voltage component divided by the appropriate impedance at the voltage component frequency:

$$i(t) = \frac{A\cos[\omega_1 t + \phi_1]}{|Z_1|} + \frac{B\cos[(\omega_1 - \omega_D)t + \phi_2 + \xi]}{|Z_2|} \quad (11)$$

where $|Z_1| = |Z(\omega_1)|$ $\phi_1 = \angle Z(\omega_1)$ and $|Z_2| = |Z(\omega_1 - \omega_D)|$ $\phi_2 = \angle Z(\omega_1 - \omega_D)$ The voltage and current signals are squared by squaring circuits 503 and 504, FIG. 5. A commercially available squaring circuit is the MC1595 multiplier circuit manufactured by Motorola Semiconductors, Phoenix, Ariz. This circuit is described in the *Linear Integrated Circuits Data Book*, third edition, November 1973, Motorola Semiconductor Products. The functional diagram of the MC1595 is shown in FIG. 6. The squaring function is achieved by connecting both the $x$ input lead 600 and the $y$ input lead 601 to the line carrying $i(t)$ or $v(t)$. A voltage proportional to the product of the voltages appearing on the $x$ 600 and $y$ 601 leads appears on the output lead 602.

The squared current on lead 510 and squared voltage on lead 511 are each applied to a bandpass filter 505, 506 with a passband centered at frequency $f_D$. The effect of squaring the voltage waveform of Equation (10) and of squaring the current waveform of Equation (11) yields multiple frequency terms, but the bandpass filters 505, 506 allow only those within the pass-band $f_D$. Thus the output from the bandpass filters is of the form:

$$v_o = K\cos[\omega_D t - \xi + \beta_v] \quad (12)$$

and $$i_o(t) = K\cos[\omega_D t - \xi + \beta_I + (\phi_1 - \phi_2)] \quad (13)$$

where

K is a constant, $\beta_v$ is the phase shift in the voltage expression resulting from the bandpass filter, and $\beta_I$ is the phase shift in the current expression resulting from the bandpass filter. It is desired to produce a signal proportional to the derivative of phase angle between $i(t)$ and $v(t)$; hence $i_o(t)$ and $v_o(t)$ are applied on leads 512 and 513 to a phase comparator circuit 507.

Figure 7:
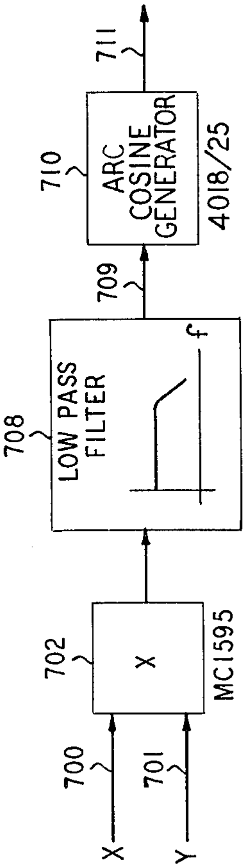

The comparator circuit 507 is specifically shown in FIG. 7. The basic element is a multiplier circuit 702, such as the MC1595. If a cosine waveform of a given frequency is applied to the $y$ lead 701, the output from the multiplier circuit 702 is the sum of a cosine wave at twice the given frequency plus a constant voltage proportional to the phase angle. The low pass filter 708 is used to filter out the high frequency term leaving a signal proportional to the cosine of the differential phase, $\cos[\phi_1 - \phi_2 + \beta_I - \beta_v]$ on lead 709.

The signal appearing on lead 709 is the input signal to an arc cosine function generator 710. The output signal on lead 711 is proportional to the differential phase, $$\phi_1 - \phi_2 + \beta_I - \beta_v$$

A commercially available arc cosine generator is the 4018/25 circuit manufactured by Burr-Brown, Tucson, Ariz., and described in the Burr-Brown Fall 1968 Instrumentation Measurement and Control Catalog.

The constant error term, $\beta_I - \beta_v$, can be removed through calibration, tracking, or since it is a dc term, will appear along with $d\phi_o/d\phi$ as a low frequency term in the power spectrum and can be removed.

the phase $d\phi$. The differential phase is obtained as a function of frequency by sweeping the frequency of the input voltage with the sawtooth function shown in FIG. 3.

The power spectrum of the output waveform from the phase comparator appearing on line 520 can be determined through the use of a commercially available spectrum analyzer such as the Tektronix type 1L5 spectrum analyzer unit. Used in conjunction with an oscilloscope a display of the spectral power is obtained as a function of frequency. This unit is described in Catalog 27, 1968, of Tektronix, Inc. Beaverton, Ore., 97005. The frequencies of the maxima are determined, and the several distances to faults obtained through the use of Equation (9).

It is apparent that there has been provided in accordance with the invention novel apparatus which fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A transmission line fault location system comprising:

means for generating a swept-frequency periodic signal proportional to the derivative of the phase of the input impedance of said line with respect to frequency, and means for measuring the frequencies of the maxima of the power spectrum of said signal.

2. Apparatus for locating telephone cable faults detectable as one or more impedance irregularities at the input terminals of a cable pair comprising:

means for generating a steady-state cosine wave and for applying said wave to said input terminals of the cable pair, means for periodically swept-frequency modulating said steady-state wave over a predetermined frequency range thereby generating periodic time functions, means for generating a signal proportional to the derivative with respect to frequency of the phase of the input impedance of said cable pair, means for determining the power spectra of said periodic functions, and means for identifying the frequencies of the maxima of said power spectra, said identified frequencies being proportional to distances to faults from said input terminals.

3. Apparatus for developing indicia of the distance of a telephone cable pair fault from a central location comprising:

means for applying a sinusoidal voltage signal to said faulted cable, means for repeatedly and substantially linearly varying the frequency of said test signal within a predetermined frequency range, means for measuring the current which flows in the faulted cable in response to the input voltage, means for squaring and bandpass filtering signals proportional to said input voltage and said current, means for comparing the phase angle of said squared and bandpass filtered current and voltage signals to produce a signal proportional to the derivative with respect to frequency of the phase angle between said current and voltage, and means for generating a spectral analysis of said phase derivative.

* * * * *